United States Patent
Shrivastava et al.

(10) Patent No.: US 11,436,592 B2
(45) Date of Patent: Sep. 6, 2022

(54) SYSTEMS AND METHODS FOR COORDINATING VIRTUAL WALLET DEFAULTS

(71) Applicant: MASTERCARD INTERNATIONAL INCORPORATED, Purchase, NY (US)

(72) Inventors: Nitin Shrivastava, Stamford, CT (US); Joseph Damon Hayes, Montclair, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 296 days.

(21) Appl. No.: 15/717,345

(22) Filed: Sep. 27, 2017

(65) Prior Publication Data
US 2019/0095905 A1  Mar. 28, 2019

(51) Int. Cl.
*G06Q 20/32* (2012.01)
*G06Q 20/36* (2012.01)
*G06Q 30/02* (2012.01)

(52) U.S. Cl.
CPC ......... *G06Q 20/36* (2013.01); *G06Q 30/0226* (2013.01)

(58) Field of Classification Search
CPC . G06Q 20/36; G06Q 30/0226; G06Q 20/3223
See application file for complete search history.

(56) References Cited

U.S. PATENT DOCUMENTS

| 2013/0132219 A1* | 5/2013 | Liberty | G06Q 20/36 705/21 |
| 2013/0191227 A1* | 7/2013 | Pasa | G06Q 20/367 705/14.73 |
| 2014/0279437 A1* | 9/2014 | Lee | G06Q 20/227 705/39 |

(Continued)

OTHER PUBLICATIONS

Secure Mobile Payment via Trusted Computing, Qi Li, ird Asia-Pacific Trusted Infrastructure Technologies Conference (pp. 98-112) (Year: 2008).*

*Primary Examiner* — Abhishek Vyas
*Assistant Examiner* — Darnell A Pouncil
(74) *Attorney, Agent, or Firm* — Harness, Dickey & Pierce, P.L.C.

(57) ABSTRACT

Systems and methods are provided for notifying providers associated with virtual wallets that the virtual wallets are default virtual wallets for consumers and/or communication devices. One exemplary method includes receiving, at a wallet platform, a request, from a wallet provider associated with a virtual wallet, for confirmation that the virtual wallet is a default virtual wallet at a communication device, determining, by the wallet platform, whether the virtual wallet is the default virtual wallet at the communication device, and providing, by the wallet platform, a notification to the wallet provider. In connection therewith, the notification indicates whether or not the virtual wallet is the default virtual wallet at the communication device, thereby permitting the wallet (Continued)

provider to incentivize a consumer associated with the communication device to select the virtual wallet as the default virtual wallet when the virtual wallet is not the default virtual wallet.

9 Claims, 7 Drawing Sheets

(56) References Cited

U.S. PATENT DOCUMENTS

| | | | |
|---|---|---|---|
| 2015/0019320 A1* | 1/2015 | Menendez | G06Q 20/36 |
| | | | 705/14.31 |
| 2017/0278096 A1 | 9/2017 | Chitalia et al. | |
| 2018/0293573 A1* | 10/2018 | Ortiz | G06Q 20/023 |
| 2019/0095906 A1 | 3/2019 | Shrivastava et al. | |

* cited by examiner

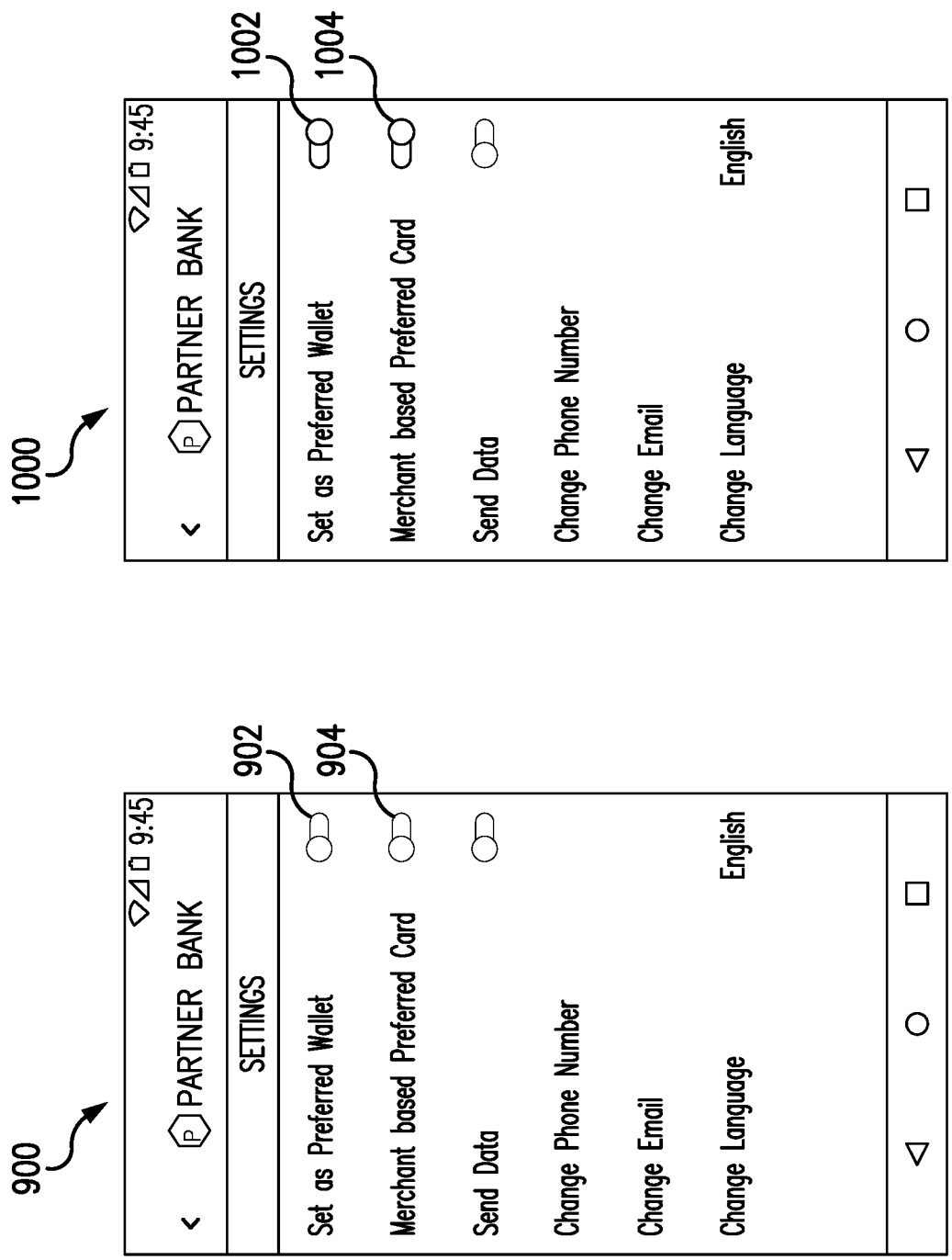

SYSTEMS AND METHODS FOR COORDINATING VIRTUAL WALLET DEFAULTS

FIELD

The present disclosure generally relates to systems and methods for coordinating virtual wallet defaults, and in particular, to systems and methods for identifying virtual wallet default designations associated with wallet platforms and/or merchants and then permitting offers associated with the virtual wallets to be issued to consumers for altering the default designations of the virtual wallets.

BACKGROUND

This section provides background information related to the present disclosure which is not necessarily prior art.

Consumers are known to use payment accounts to fund transactions for different types of products (e.g., goods and services, etc.), at different merchants. Conventionally, consumers present payment cards at physical locations of the merchants to initiate funding of the transactions through the payment accounts. Alternatively, when the transactions occur at virtual locations associated with the merchants, the payment cards are presented, for example, by the consumers keying in account numbers embossed on the payment cards. More recently, payment accounts can be provisioned to virtual wallets. The consumers are then able to present or "tap" the virtual wallets, as included in smartphones or other portable communication devices, at the locations of the merchants thereby providing the payment accounts associated therewith for funding the transactions. Such virtual wallets are known to be provided by issuers of the payment accounts and by other entities, such as payment networks (e.g., the MasterPass® virtual wallet from MasterCard®, etc.), electronics providers (e.g., the Apple Pay® virtual wallet from Apple®, the Samsung Pay® virtual wallet from Samsung®, etc.), etc.

DRAWINGS

The drawings described herein are for illustrative purposes only of selected embodiments and not all possible implementations, and are not intended to limit the scope of the present disclosure.

Figure 1:
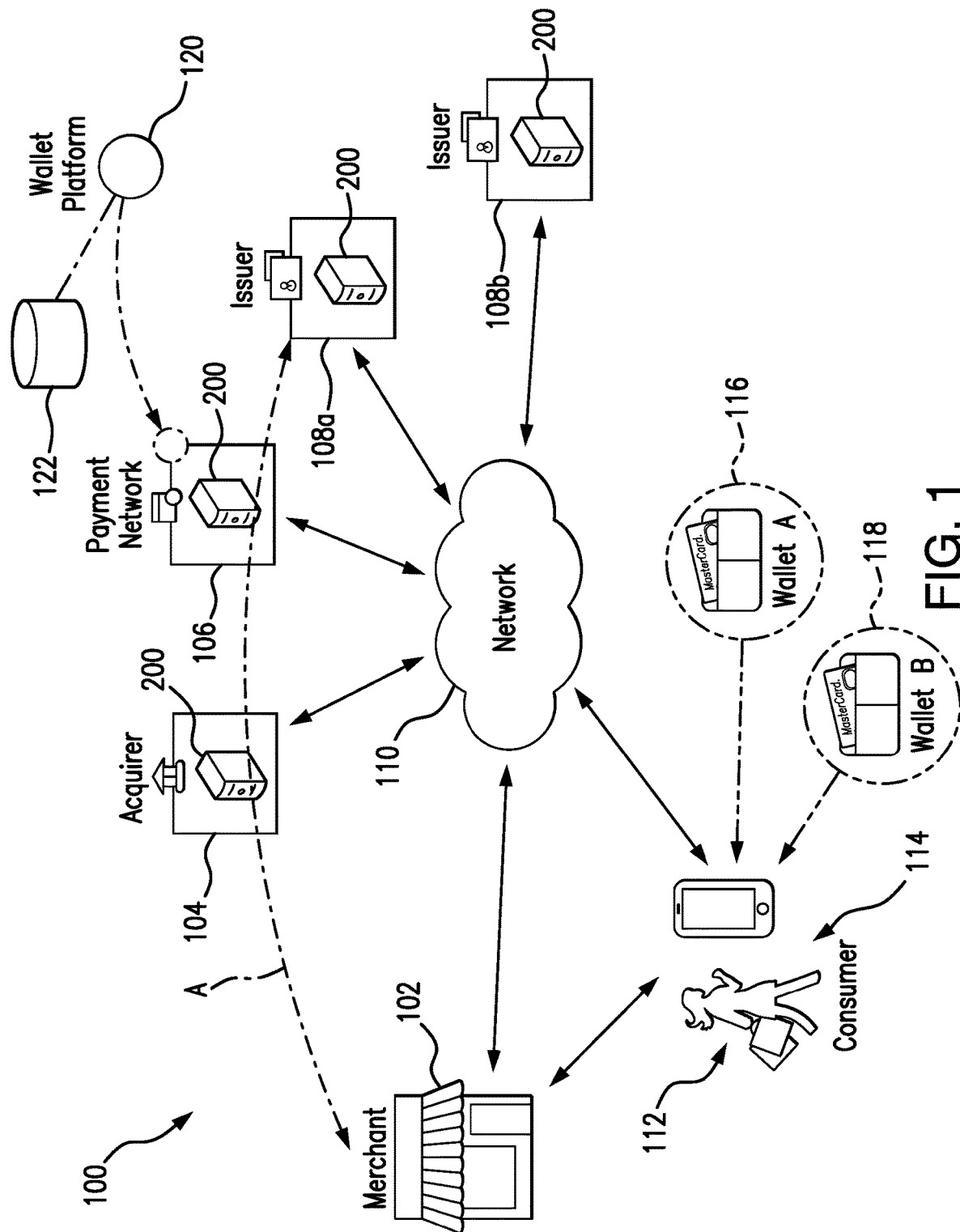
FIG. 1 is a block diagram of an exemplary system of the present disclosure suitable for use in coordinating virtual wallet defaults for one or more merchants and/or one or more wallet platforms.
Figure 3:
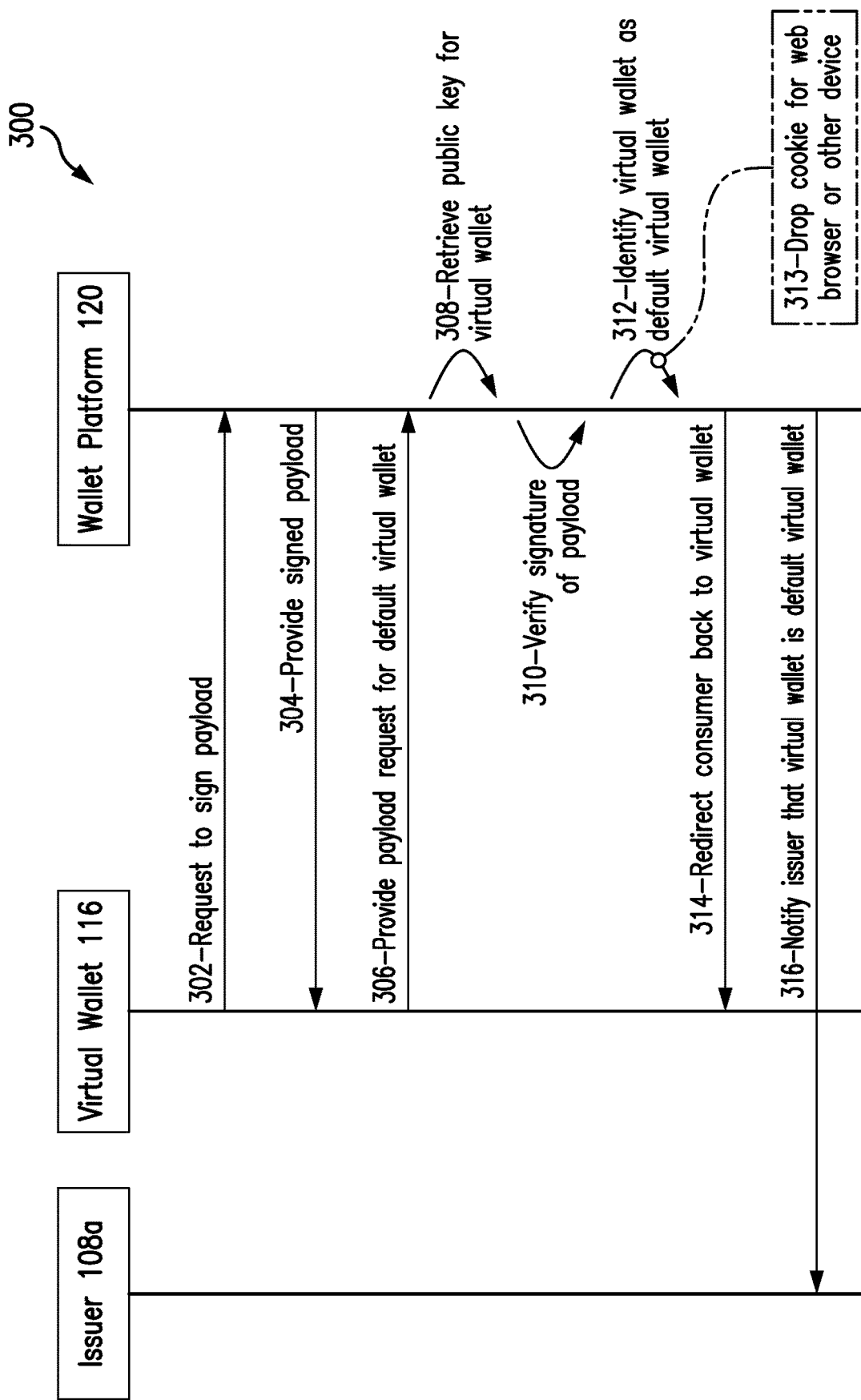
FIG. 3 is a flow diagram of an exemplary method, which may be implemented in connection with the system of FIG. 1, for use in permitting a user to select and/or identify one or more virtual wallet defaults associated with merchant virtual locations and/or wallet platforms.
Figure 4:
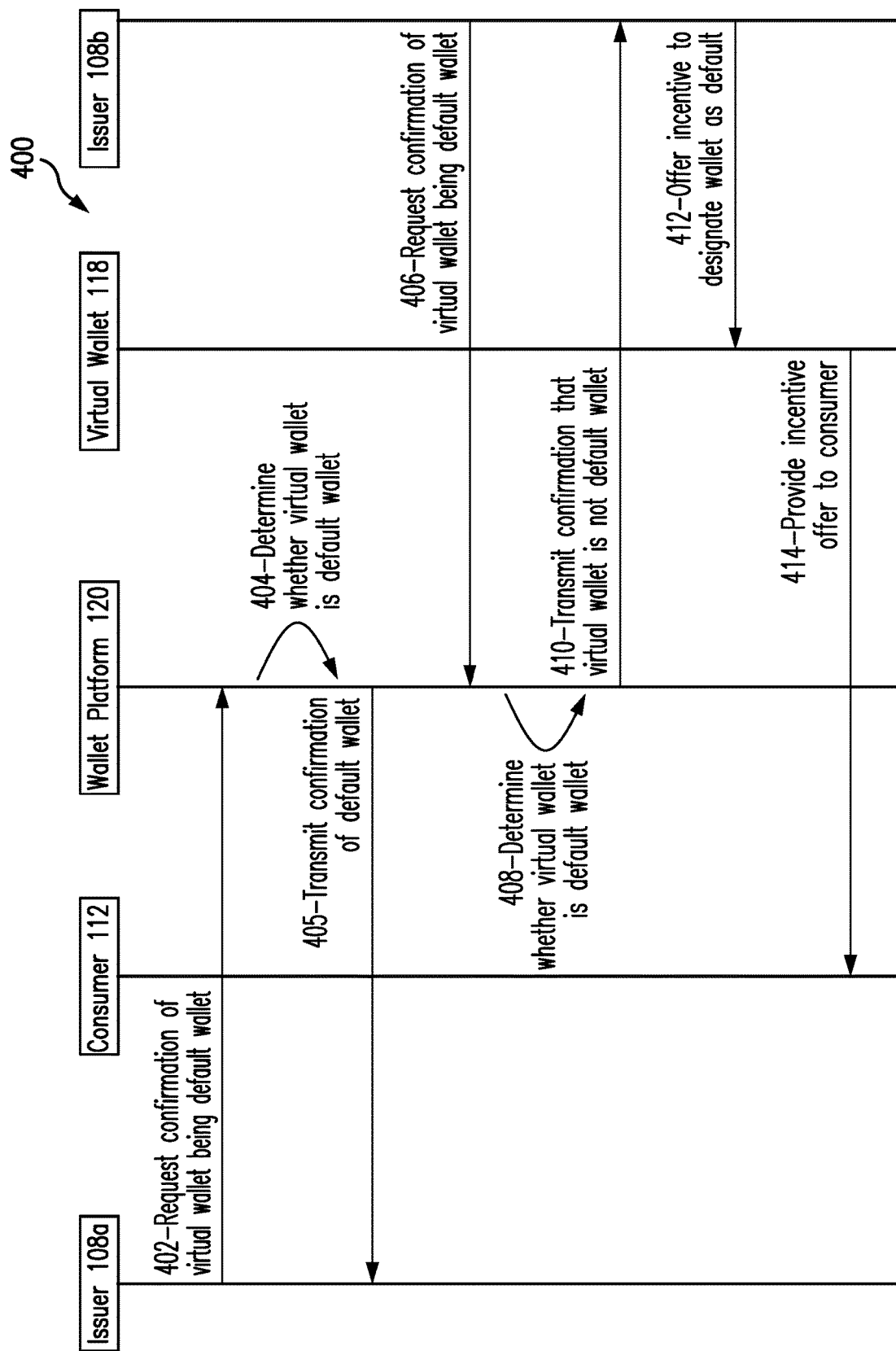
FIG. 4 is a flow diagram of an exemplary method, which may be implemented in connection with the system of FIG. 1 and/or the method of FIG. 3, for use in notifying an wallet provider about selection of a virtual wallet associated with the wallet provider as the default wallet for a user.
Figure 5:
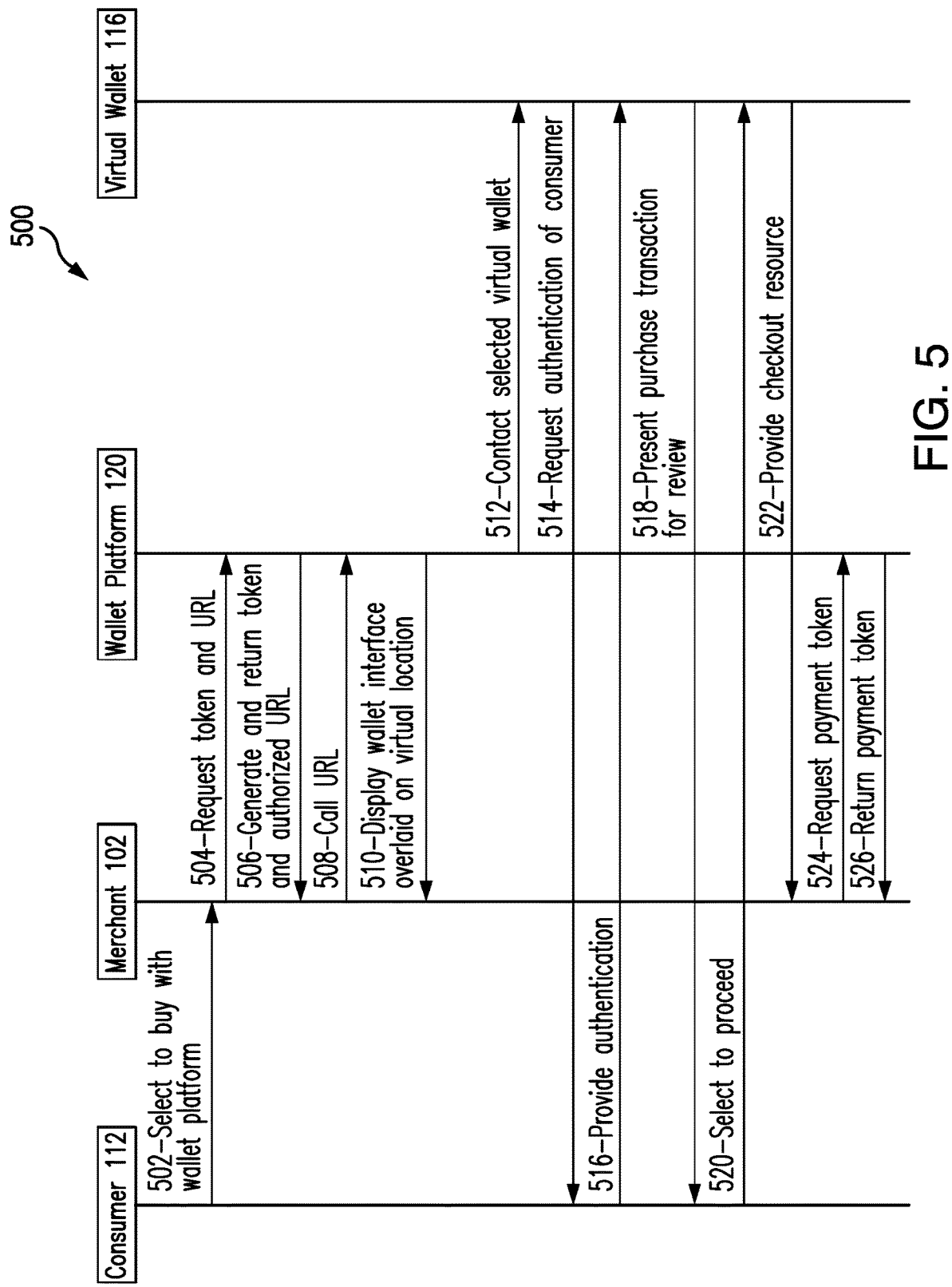

FIG. 5 is a flow diagram of an exemplary method, which may be implemented in connection with the system of FIG. 1 and/or the methods of FIGS. 3 and 4, through which a user may use a default virtual wallet, at a communication device, in connection with performing a transaction; and FIGS. 6-10 illustrate exemplary interfaces in which a user is permitted to designate a virtual wallet as a default virtual wallet at a communication device associated with the user, and which may be used in connection with the system of FIG. 1 and/or the methods of FIG. 3-5.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Many financial institutions (e.g., issuers, etc.) and other entities (broadly, providers) offer electronic wallets or e-wallets, also known as virtual wallets, to consumers (broadly, users) for use in presenting their payment accounts to merchants in connection with purchase transactions at the merchants for products. Often, the virtual wallets rely on virtual wallet platforms (e.g., by integration, or as a service, etc.) to provide certain operations associated with use of the virtual wallets. Thereafter, when used in connection with the wallet platforms, the virtual wallets may be selected, for example, as defaults, whereby the default virtual wallets are preselected (or automatically selected) for use in connection with specific merchants, or in general, but are subsequently changeable by the consumers, for example, upon selection of different virtual wallets. In connection therewith, when a virtual wallet is selected as the default, the provider associated with the virtual wallet is notified. However, even though the virtual wallet has been selected as the default, for a next purchase the consumer may select to use a different virtual wallet as the default, whereby the subsequent provider of the different virtual wallet is then notified, but the provider of the prior virtual wallet is not notified that its virtual wallet is no longer the consumer's default. As such, the provider of the prior virtual wallet may still believe that its virtual wallet is the default virtual wallet for a merchant (and/or a wallet platform) when, in fact, it is not. Uniquely, the systems and methods herein permit a notification indicative of whether or not a virtual wallet of a provider is selected as a default by a consumer, so that the provider may offer one or more incentives to the consumer to designate the virtual wallet as the default (when it is not already the default). In this manner, the providers associated with different virtual wallets will be notified as to whether or not their virtual wallet is the default for the consumer. And, if they are not, the providers are able to then offer one or more incentives to the consumer to encourage designating their virtual wallets as the default.

FIG. 1 illustrates an exemplary system 100 in which the one or more aspects of the present disclosure may be implemented. Although the system 100 is presented in one arrangement, other embodiments may include the parts of the system 100 (or other parts) arranged otherwise depending on, for example, implementation of virtual wallets, interactions between the virtual wallets and wallet platforms, types of communication devices and/or merchant virtual locations available for use in purchase transactions, etc.

The system 100 generally includes a merchant 102, an acquirer 104 associated with the merchant 102, an acquirer 104 generally associated with the merchant 102, a payment network 106, and two issuers 108*a-b* configured to issue payment accounts (or other accounts) to consumers, each of which is coupled to (and is in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuers 108a-b and, separately, the public Internet, which may provide interconnection between the merchant 102, the payment network 106, and/or a consumer 112 (broadly, a user) via his/her communication device 114, etc.

The merchant 102 generally offers products (e.g., goods and/or services, etc.) for sale to consumers in the system 100, including the consumer 112. As it pertains to the description herein, generally, the merchant 102 offers the products for sale through virtual locations (e.g., websites, applications, etc.). The virtual locations permit the consumer 112 to browser different products, select one or more of the product(s) for purchase, and proceed to checkout, whereby the consumer 112 is able to purchase the product(s), etc.

In this exemplary embodiment, when the consumer 112 purchases a product from the merchant 102 through a virtual location associated with the merchant 102, the consumer 112 is prompted at checkout, and/or is otherwise permitted, to select and/or enter a method of payment for the product. In turn, the consumer 112 is able to select, at the merchant's virtual location, a method for funding the transaction (e.g., the consumer 112 may select to fund the transaction with a virtual wallet, etc.).

Also in this exemplary embodiment, the communication device 114 includes two virtual wallets 116 and 118 (also referred to as electronic wallets, or e-wallet, etc.) (identified as wallet A and wallet B, respectively, in FIG. 1). Each of the virtual wallets 116 and 118 is provisioned with a payment account. In particular, the virtual wallet 116 is associated with the issuer 108a and is provisioned with a credential associated with a payment account issued to the consumer 112 by the issuer 108a (i.e., a first payment account) Likewise, the virtual wallet 118 is associated with the issuer 108b and is provisioned with a credential associated with a payment account issued to the consumer 112 by the issuer 108b (i.e., a second payment account). As such, the issuers 108a-b may also be considered wallet providers herein. And, in this manner, the consumer 112 is able to select between the two virtual wallets 116 and 118, and thereby select to fund the transaction with the merchant 102 by either the first payment account or the second payment account. It should be appreciated that while only one payment account is associated with each of the virtual wallets 116 and 118 in this embodiment, more than one payment account may be provisioned to one or both of the virtual wallets 116 and 118 in other embodiments, whereby the consumer 112 would then be able to select between the virtual wallets 116 and 118, and then further select between the multiple payment accounts included within the virtual wallets 116 and 118. What's more, it should be appreciated that in still other embodiments the consumer 112 may include more than the two virtual wallets 116 and 118.

As described, the virtual wallets 116 and 118 are associated with the issuers 108a and 108b, respectively, in that the virtual wallets 116 and 118 are provided by and/or available from the specific issuers 108a-b (and generally branded for the issuers 108a-b). In this manner, the issuers 108a-b may be understood to be virtual wallet providers in addition to payment account issuers. While that is the case here, it should also be understood that one or both of the virtual wallets 116 and 118 may be associated with providers other than financial institutions (e.g., other than account issuers, etc.) in other embodiments. For example, in other embodiments, one or both of the virtual wallets 116 and 118 may be associated with an electronics manufacturer as the provider, which then includes/installs the virtual wallet(s) into communication devices sold thereby. In particular, certain smartphones by Samsung® include a Samsung Pay® virtual wallet. Other exemplary virtual wallets include, without limitation, MasterPass®, Apple Pay®, PayPal®, Google Wallet®, Android Wallet™, etc., and, more generically, virtual wallet A, virtual wallet B, Bank A virtual wallet, Bank B virtual wallet (e.g., CitiPay wallet, etc.), or other suitable open or closed virtual wallets. With that said, an open virtual wallet may be provisioned with various different types of payment accounts issued from one or more different banking institutions, while a closed virtual wallet is limited to bank accounts associated with the provider of the closed wallet (e.g., Bank A virtual wallet may be a closed virtual wallet that includes Bank A accounts but not Bank B accounts, etc.).

Moreover in this exemplary embodiment, each of the virtual wallets 116 and 118 is associated with a wallet platform 120, which is configured to perform certain operations in connection with each of the virtual wallets 116 and 118. For example, the wallet platform 120 may be configured to compile and store a profile for the virtual wallets 116 or 118 (e.g., upon transaction with the virtual wallets 116 and 118, upon the consumer 112 associating his/her payment accounts with the virtual wallets 116 and 118, etc.) (e.g., in data structure 122, etc.), and further may be configured to provide payment tokens in connection with the payment accounts associated with the virtual wallets 116 and 118, etc. The virtual wallets 116 and 118, then, are configured to coordinate interactions (e.g., with the consumer 112, the merchant 102, etc.) at the communication device 114. In one example, the wallet platform 120 includes the MasterPass™ wallet platform. That said, as generally described herein, other wallet platforms may be employed in other embodiments, generally, so long as the wallet platform supports multiple virtual wallets (as provided by the platform 120 itself and/or by third parties (e.g., the issuers 108a-b), etc.).

In operation, the virtual wallets 116 and 118, in cooperation with the wallet platform 120, permit the consumer 112 to present one or more credentials associated with one of the virtual wallets 116 and 118 (and, specifically, the first or second payment accounts associated therewith) to the merchant 102 in connection with a purchase transaction at the merchant 102 for a product. More specifically, in one example, the consumer 112 may interact with a virtual location of the merchant 102 (e.g., a website, etc.), via a web browser at the communication device 114, to identify the product. The web browser may include, for example, an Internet Explorer™ web browser, a Chrome™ web browser, a Firefox™ web browser, a Safari™ web browser, or a Microsoft Edge™ web browser, or other suitable web browser, etc. By interacting with the merchant's virtual location, the consumer 112 is able to then select the product (or one or more other products) to purchase, and to initiate the purchase transaction therefor by selecting to pay with one of his/her virtual wallets 116 and 118 and, specifically, to pay through the wallet platform 120.

However, in this example operation, prior to interacting with the merchant 102, the consumer 112 initially accesses one or both of the virtual wallets 116 and 118 (and various interfaces associated therewith, for example, as illustrated and/or described herein) to set one or more defaults associated with the virtual wallets 116 and 118 (e.g., to set the consumer's first or second payment account as a default payment account for one or more transactions, etc.).

Figure 8:
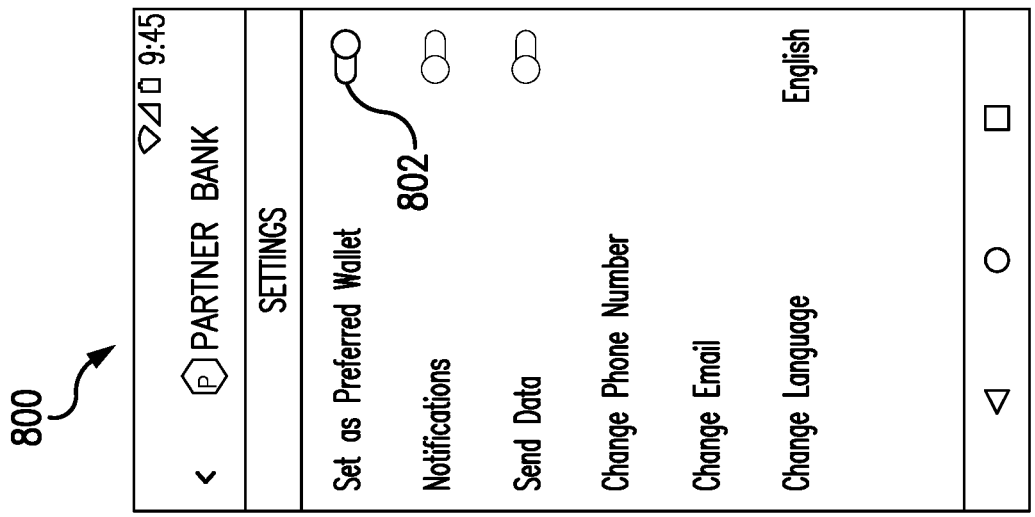
Figure 7:
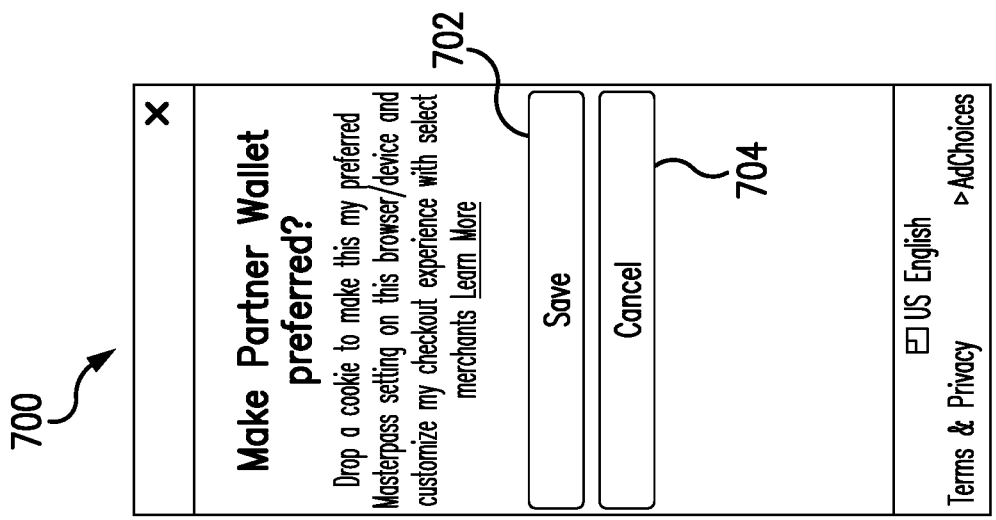
Figure 6:
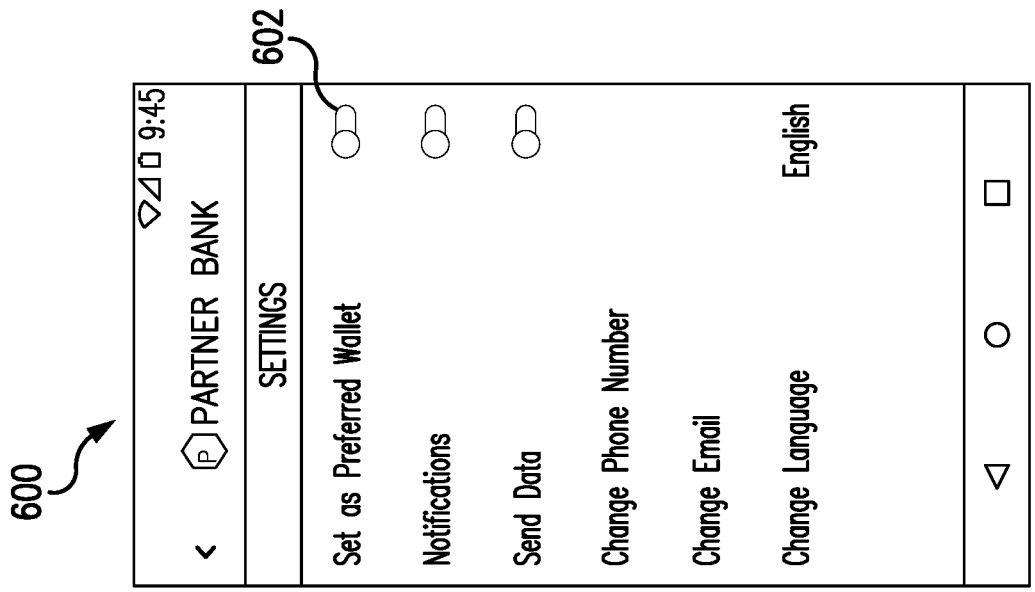

For instance, FIGS. 6-8 illustrate example interfaces 600-800 that may be displayed to the consumer 112 at his/her communication device 114, by the wallet platform 120, in connection with setting the virtual wallet 116 as his/her default wallet. In particular, FIG. 6 illustrates example settings interface 600, which may be displayed to the consumer 112 upon initially accessing his/her virtual wallet 116. In connection therewith, the consumer 112 is presented with various options relating to the virtual wallet 116, including an option 602 to set the virtual wallet 116 (and the corresponding first payment account associated therewith) as the default wallet to be used in subsequent transactions by the consumer 112 (i.e., "Set as Preferred Wallet"). Upon activation of the option 602 (e.g., upon requesting the wallet platform to sign a payload, etc.), interface 700 of FIG. 7 is displayed to the consumer 112 (by the wallet platform, for example, in connection with providing the signed payload to the virtual wallet 116, etc.). Here, the consumer 112 is prompted to agree to drop a cookie (or multiple cookies) in the current communication device 114 (or current browser, etc.), to thereby impose the virtual wallet 116 (and, potentially, one or more desired settings associated therewith) as the consumer's preferred and/or default wallet.

In connection with interface 700, if the consumer 112 selects to cancel the cookie drop, via "Cancel" option 704, the interface 700 will close and return the consumer 112 to the prior interface 600 or some other interface within and/or associated with the virtual wallet 116. Conversely, if the consumer 112 selects to "Save" the virtual wallet as the default virtual wallet, by selecting option 702, a payload is returned by the virtual wallet 116 to the wallet platform 120 in connection with requesting the virtual wallet 116 to be identified, set, etc. as the consumer's default virtual wallet. Thereafter, the wallet platform 120 runs one or more checks to confirm the parameters of the payload (e.g., the wallet platform may check a whitelist of parameters for accuracy, validity, etc.; etc.). When the payload is confirmed (or checks out), the wallet platform 120 will drop a cookie (or multiple cookies) related to the virtual wallet 116. When multiple cookies are dropped, each or multiple ones of the cookies may include a parameter associated with the virtual wallet 116, for example, a wallet ID, a card ID for a card within the virtual wallet 116, a locale associated with the virtual wallet 116 and/or communication device 114, and a tier associated with the virtual wallet and/or communication device 114, etc. Then, upon dropping the cookie(s), the interface 800 of FIG. 8 is displayed to the consumer 112 confirming, at option 802, that the virtual wallet 116 is set as the consumer's preferred wallet in subsequent transactions in which the consumer 112 is able to use his/her virtual wallet 116 for funding (e.g., the interface 800 provides an indicator to the consumer 112 that the virtual wallet 116 is set as the consumer's default wallet, etc.).

In some instances, the cookie(s) dropped by the wallet platform 120 (e.g., upon activation of the save option 702 at the interface 700, etc.) may be specific to a particular merchant (e.g., the merchant 102, etc.) or merchants, such that the virtual wallet 116 may then also be identified as the default virtual wallet for subsequent transactions performed at the particular merchant(s). Further, in some instances, the cookie(s) may be associated with a network-based application included in the communication device 114, such that the virtual wallet 116 may be identified as the default virtual wallet for subsequent transactions performed via the network-based application.

Apart from displaying the interfaces 600-800 to the consumer 112, the wallet platform 120 is also configured to drop the cookie(s) for the selected wallet 116, when the selection of the virtual wallet 116 as the default virtual wallet is confirmed by the consumer 112 at interface 700, whereby the wallet platform 120 then knows that the virtual wallet 116 is set as the consumer's default wallet. In this manner, the next time the consumer 112 checks out at the merchant's virtual location (e.g., in connection with the above example transaction between the consumer 112 and the merchant 102, etc.), via the wallet platform 120 (or at other merchant locations in this example), the default virtual wallet 116 will be automatically selected (or preselected) for use in the transaction. What's more, upon the selection by the consumer 112 of the virtual wallet 116 as his/her default wallet, the issuer 108*a* associated with the selected virtual wallet 116 is also informed of the cookie drop (or of a failed cookie drop, if appropriate), and thereby informed/notified that its virtual wallet 116 is the current default wallet for the consumer 112 at the communication device 114.

Referring again to the purchase transaction between the consumer 112 and the merchant 102, in response to the consumer 112 initiating the transaction, the merchant 102 communicates with the wallet platform 120, whereupon the wallet platform 120 is configured to initiate a payment session with the consumer 112 through a web browser (at the communication device 114). In connection therewith, it should be appreciated that the merchant 102 is integrated with the wallet platform 120 and thereby has access to the information associated with the dropped cookie(s) (and, thus, is aware that virtual wallet 116 is the default wallet selection for the consumer 112 for the given transaction). Specifically, the wallet platform 120 is configured to provide an interface, which presents at the communication device 114 the preferred virtual wallet 116 associated with the consumer 112 and the wallet platform 120 (e.g., the selected virtual wallet 116, etc.).

Thereafter, the wallet platform 120 is configured to transmit a request for the consumer 112 for authentication, to the virtual wallet 116, for example. In response, the communication device 114, as configured by the virtual wallet 116, solicits one or more authentications credentials from the consumer 112 (e.g., login credentials, biometrics, personal identification numbers (PINs), etc.). The authentication may be accomplished at the virtual wallet 116, alone, or in combination with the wallet platform 120, or otherwise.

Once the consumer 112 is authenticated, the communication device 114, as configured by the virtual wallet 116, is configured to retrieve certain information from the wallet platform 120 for the consumer 112 to be used in the purchase transaction for the product at the merchant 102, including, without limitation, a shipping address, etc. Upon receipt of the information, the communication device 114, as configured by the virtual wallet 116, is configured to verify the information (e.g., the shipping address and/or other details, etc.), if any, with the consumer 112. Once verified, the communication device 114, as configured by the virtual wallet 116, is configured to return a checkout resource to the merchant 102, at the merchant's virtual location. In response, the merchant 102 is configured to request a payment account credential (e.g., a payment token, etc.)

from the wallet platform 120. And, the wallet platform 120 is configured to generate and return the token to the merchant 102.

Then in this example purchase transaction, the merchant 102 is configured to compile and submit an authorization request for the transaction (including the payment token) to the acquirer 104 (associated with the merchant 102), along path A, as referenced in FIG. 1. The acquirer 104 in turn communicates the authorization request with the payment network 106 (e.g., through MasterCard®, VISA®, Discover®, American Express®, etc.), to convert the payment token to a payment account credential (e.g., a primary account number (PAN), etc.), and the payment network 106 passes the authorization request to the issuer 108*a* (as associated with the payment account of the selected virtual wallet 116). Thereafter, the issuer 108*a* determines whether the payment account is in good standing and whether there is/are sufficient funds and/or credit to cover the transaction. If the transaction is approved, an authorization reply or response (indicating the approval of the transaction) is transmitted back from the issuer 108*a* to the merchant 102, again along path A, thereby permitting the merchant 102 to complete the transaction. The transaction is later cleared and/or settled by and between the merchant 102, the acquirer 104, and the issuer 108*a* by appropriate agreements. If the transaction is declined, however, the authorization reply (indicating the decline of the transaction) is provided back to the merchant 102, also along the path A, thereby permitting the merchant 102 to halt or terminate the transaction.

Transaction data is generated, collected, and stored as part of the above interactions among, the merchant 102, the acquirer 104, the payment network 106, the issuer 108*a*, and the consumer 112. The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). In general, the transaction data may include, for example, PANs for payment accounts involved in the transactions, payment tokens, amounts of the transactions, merchant IDs for merchants involved in the transactions, merchant category codes (MCCs), dates/times of the transactions, etc. It should be appreciated that more or less information related to transactions, as part of either authorization or clearing and/or settling, may be included in transaction records and stored within the system 100, at the acquirer 104, the payment network 106 and/or the issuer 108*a*.

In various exemplary embodiments, consumers (e.g., consumer 112, etc.) involved in the different transactions herein are prompted to agree to legal terms associated with their payment accounts, for example, during enrollment in their accounts, during installation of the virtual wallets 116 and 118, etc. In so doing, the consumers may voluntarily agree, for example, to allow the payment network 106, the wallet platform 120, the virtual wallets 116 and 118, and/or issuers, etc., to use data collected during enrollment and/or collected in connection with processing the transactions, subsequently for one or more of the different purposes as described herein.

While one merchant 102, one acquirer 104, one payment network 106, two issuers 108*a-b*, and one wallet platform 120 are illustrated in FIG. 1, it should be appreciated that any number of these entities (and their associated components) may be included in the system 100, or may be included as a part of systems in other embodiments, consistent with the present disclosure. Likewise, it should be appreciated that the system 100 and other system embodiments is not limited to one consumer 112, one communication device 114 and two virtual wallets 116 and 118, as a different number of each may be included in other system embodiments. Further, as described, the communication device 114 is generally configured to perform one or more operations described herein generally in coordination with the virtual wallets 116 and 118 (even if the virtual wallets 116 and 118 are not specifically referenced), although this is not required in all embodiments.

Figure 2:
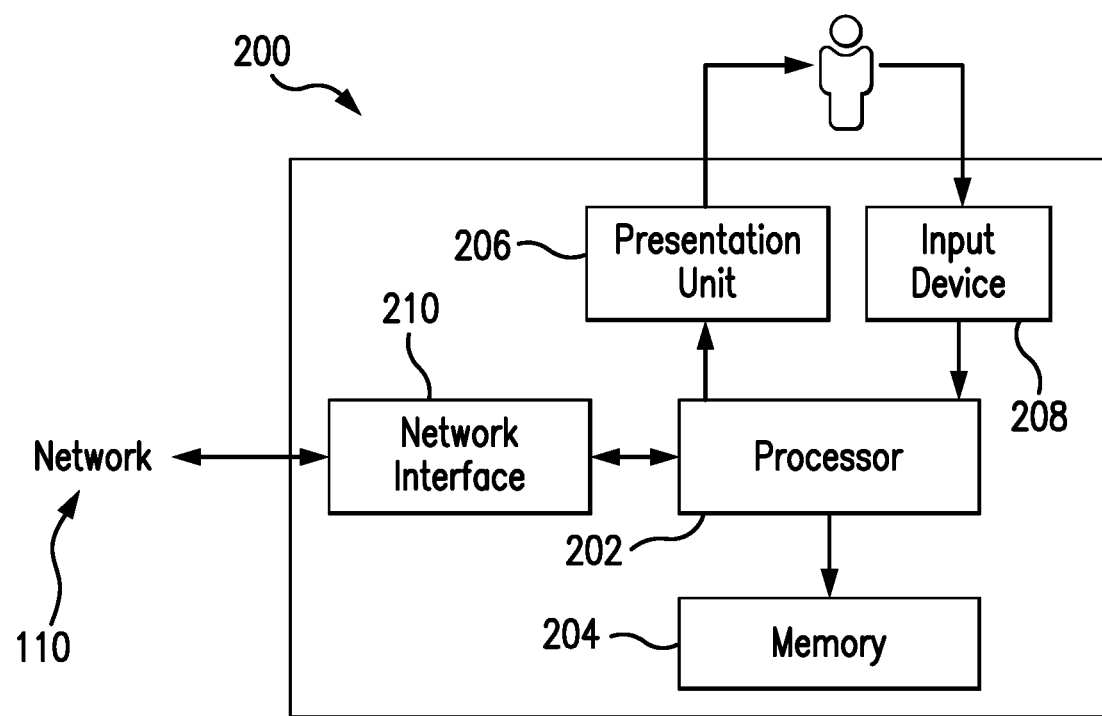
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein (broadly, the computing device 200 may include on or more computing devices, etc.). In the exemplary embodiment of FIG. 1, each of the acquirer 104, the payment network 106, and the issuers 108*a-b* are illustrated as including, or being implemented in, computing device 200, coupled to (and in communication with) the network 110. In addition, the merchant 102 may also be considered as including and/or being implemented in at least one computing device consistent with computing device 200. Further, the communication device 114 associated with consumer 112 and the wallet platform 120 can also each be considered (or may each include and/or be associated with) a computing device consistent with computing device 200 for purposes of the description herein. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, cookies, default designations, payment account information (e.g., payment account credentials, payment tokens, etc.), interfaces, offers for incentives, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., incentives to select one of the virtual wallets 116 and 118 as a default, etc.), visually, for example, to a user of the computing device 200, such as the consumer 112 in the system 100, etc. And, various interfaces (e.g., as defined by websites, as defined by network-based applications such as virtual wallets 116 and 118, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

In addition, the computing device 200 includes an input device 208 that receives inputs from the user (i.e., user inputs) such as, for example, inputs by the consumer 112 to the communication device 114 to designate one of the virtual wallets 116 and 118 as a default virtual wallet, as further described below; etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC™) adapter, a Bluetooth™ adapter, etc.), a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, in addition to the above, the wallet platform 120 is also configured to notify the issuer 108a, or the issuer 108b, as to whether or not the associated virtual wallet 116 or 118 is the default virtual wallet for the merchant 102 (or for the wallet platform 120), for example, as selected or designated by the consumer 112. Specifically, when the virtual wallet 116, for example, is selected as the default virtual wallet for the merchant 102 (e.g., as described above in connection with the exemplary transaction with the merchant 102, etc.), the designation is stored by the wallet platform 120 in data structure 122 associated with the wallet platform 120 (e.g., in memory 204 of the wallet platform 120, etc.). Thereafter, from time to time, the issuer 108a (or the issuer 108b), after its virtual wallet 116 (or virtual wallet 118) is designated as the consumer's default virtual wallet for the merchant 102 (or regardless of whether its virtual wallet 116 is the designated as the current default virtual wallet for the consumer 112), may elect to determine if its associated virtual wallet is still designated as the default virtual wallet. To do so, the issuer 108a, for example, calls an application programming interface (API) associated with the wallet platform 120 (or more generally, requests confirmation of the default virtual wallet 116 for the consumer 112, or otherwise). The wallet platform 120, in turn, is configured to identify the virtual wallet default designation for the consumer 112 and/or the communication device 114 (e.g., in the data structure 122, etc.) and respond with a notification, which confirms to the issuer 108a whether or not the virtual wallet 116 is currently the default virtual wallet for the consumer 112 and/or the communication device 114. In addition, in some implementations, the issuer 108a (or the issuer 108b) may also request a determination of what particular merchants the virtual wallet 116 (or the virtual wallet 118) is set as for the default wallet. What's more, and as indicated above, the merchant 102 is integrated with and/or in communication with the wallet platform 120, for example, via an API, whereby the wallet platform 120 is also able to capture an indication of any changes to the default virtual wallet from communications therebetween (e.g., based on the cookie(s) dropped and/or wallet details, based on potential changes during a transaction checkout at the merchant 102, etc.), thereby informing the platform 120 sufficient to notify the issuer 108a, as described above.

Then, when the issuer 108a, for example (or the issuer 108b), receives the notification from the wallet platform 120, it is informed that the virtual wallet 116 is or is not the consumer's default virtual wallet for the merchant 102. In turn, when the virtual wallet 116 is not the consumer's default wallet, the issuer 108a is then able to offer one or more incentives to the consumer 112, immediately (e.g., a notification provided, by the platform 120, to the virtual wallet 116, etc.), or for a subsequent purchase (e.g., through a checkout process, etc.), to incentivize the consumer 112 to select the virtual wallet 116 as the default. Each of the one or more incentives to the consumer 112 may be tied to the selection of the virtual wallet 116 as the default wallet. This similarly applies to the notification when received by the issuer 108b (regarding its virtual wallet 118). In either case, in response, the consumer 112 is able to generally accept the incentive and select the virtual wallet 116, associated with the issuer 108a (and when not currently the consumer's default virtual wallet), as the default virtual wallet for the merchant 102. The incentives may include, for example, reductions in costs of products (in general or at particular merchants), discounts for purchases funded through the particular virtual wallets, etc.

In the illustrated embodiment, the wallet platform 120 is provided as a separate part of the system 100 and in communication with the payment network 106 (as indicated by the dotted lines in FIG. 1), for example. However, the wallet platform 120 may be incorporated, partly or entirely, into the payment network 106 of the system 100 in other embodiments. What's more, it should be appreciated that the wallet platform 120 may be associated with, or incorporated with, other parts of the system 100, in other embodiments (partly or entirely), including, for example, either of the issuers 108a-b, etc.

With that said, the wallet platform 120 is generally configured, by computer executable instructions, to perform one or more of the various different operations described herein. As an example, the following code segments may define operation of the wallet platform 120 to create and send a signed payload in response to a request by the virtual wallet 116 (e.g., in connection with generating/displaying interfaces 600 and 700 of FIGS. 6 and 7 at communication device 114, etc.) (e.g., using the RSA256 signing algorithm as a JSON Web Signature (JWS), etc.):

```
var params = {
    walletId: 'WALLET_ID', // required (WalletID consisting of
    alphabetic characters forming a name, as per Masterpass onboarding)
    returnUrl: 'RETURN_URL', // required (Callback URL after
    dropping the tiered cookies)
    country: 'US', // required (2 digit country code)
    language: 'en' // required (2 digit language code)
    cardBrand: 'CARD_BRAND', // optional
    Timestamp // required (standard timestamp, string of numbers)
    }
var params = {
    returnUrl: 'RETURN_URL', // optional (Callback URL after
    dropping the tiered cookies)
    country: 'US', // required (2 digit country code)
    language: 'en' // required (2 digit language code)
    cardBrand: 'CARD_BRAND', // optional
    Timestamp // required (standard timestamp, string of numbers)
    }
```

FIG. 3 illustrates an exemplary method 300 for use in permitting a user to select virtual wallet default settings. The exemplary method 300 is described as implemented generally in the wallet platform 120 of the system 100, in connection with operations by the consumer 112, the merchant 102, and the virtual wallets 116 and 118. The method 300 is also described with reference to the computing device 200. That said, however, the methods herein should not be understood to be limited to the system 100 or the computing device 200, as the methods may be implemented in other systems and/or computing device. Likewise, the systems and the computing devices herein should not be understood to be limited to the exemplary method 300.

In the illustrated method 300, when the consumer 112 registers a new virtual wallet to the communication device 114 or accesses an existing one of the virtual wallets 116 and 118, each of which is associated with the wallet platform 120, the consumer 112 may be requested, required or prompted to select the new virtual wallet, or one of the existing virtual wallets 116 and 118 (if not already done), as a default virtual wallet (e.g., for the wallet platform 120 in general, for use at one or more particular merchants, etc.). Specifically, for example, at 302, when the consumer 112 accesses the virtual wallet 116 (e.g., at interface 600 of FIG. 6, etc.), the virtual wallet 116 (e.g., and various interfaces associated therewith, etc.), requests/solicits the wallet platform 120 to sign a payload from the wallet platform 120. The payload (also referred to as a payload request), in this embodiment, includes a wallet ID for the virtual wallet 116, a default language, a default country, and/or time stamp for the request, etc. In response, at 304, the wallet platform 120 signs the payload and provides the signed payload back to the virtual wallet 116, consistent with the request.

Next, the virtual wallet 116 provides, at 306, a payload request to the wallet platform 120 (e.g., via interface 700 of FIG. 7, etc.), and in particular, to a default control backend, which is included in the wallet platform 120, whereby the default virtual wallet for the wallet platform 120 (or for the communication device 114, etc.) may be set (or changed) to the virtual wallet 116. In particular, the payload is provided to the default control through an interface associated with the default control, such as, for example, one of the interfaces 600-800 of FIGS. 6-8, in that the payload indicates the setting (or change) of the virtual wallet 116 as the default wallet for the consumer 112. In response to the payload request, the default control (as associated with the wallet platform 120) retrieves, at 308, a public key for the virtual wallet 116 and verifies, at 310, the signature on the payload request based on the retrieved public key. In addition, the wallet platform 120 further confirms and/or verifies the returned signed payload, as being previously signed by the wallet platform 120. In this manner, the wallet platform 120 provides control over the payload, whereby no virtual wallet (e.g., virtual wallet 116, etc.) is permitted to have a cookie dropped (or multiple cookies dropped), as described below, until the wallet platform 120 has verified the request and/or payload from the virtual wallet. As such, use of and/or access to the cookie(s) associated with the default virtual wallet (e.g., virtual wallet 116, etc.) may be restricted.

Then, when the signature of the payload is verified, the default control of the wallet platform 120 identifies, at 312, the virtual wallet 116 as the default virtual wallet for the consumer 112 and/or the communication device 114. In connection therewith, the wallet platform 120 may optionally (as indicated by the dotted lines in FIG. 3) drop the default cookie(s), at 313, for a web browser and/or the communication device 114, thereby identifying the virtual wallet 116 as the default virtual wallet for the consumer 112 and/or the communication device 114 (e.g., whereby the cookie(s) identifies the virtual wallet 116 as the default virtual wallet for the consumer 112 and/or the communication device 114, etc.). In this manner, wallet platform 120 imposes the virtual wallet 116 as the default wallet at the communication device 114. In other words, the virtual wallet 116 is actually set, at the communication device 114, as the default wallet for the communication device 114 and/or consumer 112 (e.g., the default wallet for the communication device 114 and/or consumer 112 (when not already set) is specifically set to the virtual wallet 116, the current default wallet (when already set) is changed at the communication device 114 to the virtual wallet 116, etc.). As described above, it should be appreciated that the default cookie may include multiple cookies, each related to one or more specific defaults for the virtual wallet 116 such as, for example, an ID oaf the default virtual wallet 116 (e.g., a wallet ID, etc.), an ID related to a specific card in the default virtual wallet 116 (e.g., a card ID, etc.), a locale associated with the virtual wallet 116 and/or communication device 114, and/or a tier associated with the virtual wallet 116 and/or the communication device 114.

Thereafter, the default control of the wallet platform 120 redirects, at 314, the consumer 112 back to his/her virtual wallet 116. And, the consumer 112 is notified that the virtual wallet 116 is now set as the consumer's default wallet for subsequent transactions (e.g., by a status indicator in the virtual wallet 116 such as indicator 802 in interface 800, etc.). In addition in this example, the wallet platform 120 also notifies the issuer 108*a*, at 316, that its virtual wallet 116 is currently the default wallet for the consumer 112 at the communication device 114.

With that said, from time to time, the consumer 112 may desire to change the default virtual wallet at the communication device (e.g., to the virtual wallet 118 in response to an incentive provided by the issuer 108*b* or for other reasons, etc.). In such case, the wallet platform 120 may repeat the various operations of method 300 to identify the different virtual wallet as the default virtual wallet for the consumer 112 at the communication device 114.

FIG. 4 illustrates an exemplary method 400 for use in notifying a wallet provider (e.g., an issuer, etc.) about selection, by a user, of a virtual wallet associated with the wallet provider as the default wallet for the user. The exemplary method 400 is described as implemented generally in the wallet platform 120 of the system 100, in connection with operations by the consumer 112 and the virtual wallets 116 and 118. The method 400 is also described with reference to the computing device 200. That said, however, the methods herein should not be understood to be limited to the system 100 or the computing device 200, as the methods may be implemented in other systems and/or computing device. Likewise, the systems and the computing devices herein should not be understood to be limited to the exemplary method 400.

Generally in the method 400, the wallet platform 120 makes an API available to the issuers 108a-b (as associated with the virtual wallets 116 and 118 available for use in transactions by the consumer 112), which may be called by the issuers 108a-b as desired to inquire and/or determine if its particular virtual wallet 116 or 118 is, or is not, the default virtual wallet for the consumer 112 (e.g., at the merchant 102 or at other merchants, or in general; etc.). What's more, in some implementations of the method 400, the issuers 108a-b may also be able to inquire about and/or determine the particular merchants at which their virtual wallets 116 or 118 are the default virtual wallet for the consumer 112.

With that said, the issuer 108a may from time to time request, from the wallet platform 120, confirmation of whether or not the virtual wallet 116 is the consumer's default virtual wallet, at 402. And, in response, the wallet platform 120 determines, at 404, whether the virtual wallet 116 is the default virtual wallet, or not, for the consumer 112 and/or the communication device 114. Specifically, in one example, the wallet platform 120 checks for a last dropped cookie (or last dropped cookies) for the consumer 112 and/or the communication device 114. In another example, however, the wallet platform 120 may query the communication device 114 to determine the default virtual wallet. In yet another example, the wallet platform 120 may be integrated with and/or in communication with the merchant 102, via an API, for example, whereby the wallet platform 120 is able to query the merchant 102 for the latest default wallet selection.

Regardless of the manner by which the wallet platform 120 determines the default wallet for the consumer 112, the wallet platform 120 responds to the issuer 108a, via the API, with confirmation that the virtual wallet 116 is the default virtual wallet for the consumer 112, at 405 (or, when the virtual wallet 116 is not the default wallet, responds with a confirmation that the virtual wallet 116 is not the default virtual wallet). As described above in the system 100, the wallet platform 120 is aware of the default wallet selected by the consumer 112 based on the cookie drop and the information associated therewith. The confirmation to the issuer 108a may then include a message with a "Yes" or "No" indication of whether the virtual wallet 116 is the default virtual wallet, or a set bit (e.g., a 0 or 1, etc.) representing the same. In other words, the wallet platform 120 will not disclose the actual default virtual wallet, but will simply confirm whether the virtual wallet 116 associated with the requesting issuer 108a is or is not the default wallet for the consumer 112. In at least one embodiment, however, the wallet platform 120 may actually confirm the name, brand and/or type of the default virtual wallet to the requesting issuer 108a, with the proper consent from the consumer 112 and/or potentially the issuers 108a. While an API is employed herein as a manner of communication between the wallet platform 120 and the issuer 108a (and, as appropriate, the issuer 108b), it should be appreciated that other manners of communication may be employed other embodiments. What's more, in various implementations of the method 400, the confirmation from the valet platform 120 may further include an indication of the merchant and/or merchants for which the default virtual wallet selection is applicable (e.g., as determined by the consumer 112, etc.), for example, if the default wallet is not a blanket selection for all merchants/transactions.

Then in the method 400, after receiving confirmation from the wallet platform 120 regarding the consumer's default wallet selection (e.g., that the virtual wallet 116 is the default wallet, etc.), if the issuer 108a is associated with the default virtual wallet 116 (which it is in this example), the issuer 108a may do nothing, or may apply incentives to one or more purchases associated with the consumer 112 and/or the payment account provisioned to the default virtual wallet 116 (simply to reinforce the consumer 112 to use the virtual wallet 116 as the default virtual wallet selection in various transactions).

Similarly in this example, the issuer 108b may request, from the wallet platform 120, confirmation of whether or not the virtual wallet 118 is the consumer's default virtual wallet, at 406. In response, the wallet platform 120 determines, at 408, whether the virtual wallet 118 is the default virtual wallet, or not, for the consumer 112 and/or the communication device 114. And, at 410, the wallet platform 120 responds to the issuer 108b, via the API, with confirmation that the virtual wallet 118 is not the default virtual wallet for the consumer 112 (since it previously determined or concurrently determined that the virtual wallet 116 is the default wallet). This may be done in the same manner as described above for the issuer 108a (at operations 402-405).

In turn, since the virtual wallet 118 is not the default wallet, the issuer 108b may offer, at 412, an incentive to the consumer 112 to designate the virtual wallet 118 as the default wallet (in general or for a particular merchant, etc.). The incentive may include, for example, a percentage and/or a dollar amount off one or more subsequent purchases performed by the consumer 112 using the virtual wallet 118 (e.g., any subsequent purchase, a subsequent purchase at a particular merchant, etc.), or enrollment in one or more services associated with the virtual wallet 118, the issuer 108b, and/or the associated payment account, or other incentive, etc. In turn, the virtual wallet 118 receives the offered incentive from the wallet platform 120, and provides (e.g., displays, etc.) the incentive offer to the consumer 112 (at the communication device 114), at 414, who is able to then accept or decline the incentive (e.g., two percent off a next purchase using the virtual wallet 118, etc.).

FIG. 5 illustrates an exemplary method 500 through which a user may utilize a default wallet (as set by the user via method 300, for example) in connection with performing a purchase transaction. The exemplary method 500 is again described as implemented generally in the wallet platform 120 of the system 100, in connection with operations by the consumer 112, the merchant 102, and the virtual wallets 116 and 118. The method 500 is also described with reference to the computing device 200. That said, however, the methods herein should not be understood to be limited to the system 100 or the computing device 200, as the methods may be implemented in other systems and/or computing device.

Likewise, the systems and the computing devices herein should not be understood to be limited to the exemplary method 500.

In the illustrated method 500, when the consumer 112 determines to make a purchase at a virtual location associated with the merchant 102, the consumer 112 adds one or more product(s) to be purchased to a shopping cart and selects, in connection with a payment method, to purchase the one or more products with the wallet platform 120, at 502. In response, the merchant 102 requests, at 504, a token and a URL (via an API) for use in interacting with the wallet platform 120. As shown, the wallet platform 120 generates and returns the token along with the authorized URL, at 506, to the merchant 102.

The merchant 102 then calls, at 508, the URL received from the wallet platform 120, which in turn, causes the wallet platform 120 to display, at 510, a wallet interface overlaid on the virtual location of the merchant 102, i.e., overlaid on the web browser viewed by the consumer 112 (at the communication device 114). The wallet interface, in this example, identifies the virtual wallet 116 as the default wallet for use by the consumer 112 in the transaction (e.g., as set by the consumer 112 in the method 300, etc.). In some embodiments, the wallet interface may allow the consumer 112 to select a different virtual wallet (e.g., virtual wallet 118, etc.) for use in the purchase transaction with the merchant 102 (in a similar manner to the description above for method 300). Further, in some embodiments, the wallet interface may also allow the consumer 112 to then designate the selected different virtual wallet (e.g., virtual wallet 118, etc.) as a new default wallet (in general or specifically for the merchant 102, etc.). Then, in various ones of these embodiments, the wallet platform 120 may notify the issuer 108b that the virtual wallet 118, for example, is the default wallet for the consumer 112.

Next in the method 500, the wallet platform 120 contacts the selected virtual wallet 116, at 512. In response, the selected virtual wallet 116, in this example, requests authentication of the consumer 112, at 514. The consumer 112, in turn, authenticates himself/herself to the virtual wallet 116, at 516. This may be accomplished by the consumer 112 providing a PIN or biometric, or other input, to the communication device 114. The virtual wallet 116 may then verify the PIN and/or biometric, etc. (e.g., compare the input provided by the consumer 112 to a reference previously provided or obtained from the consumer 112, etc.), locally, at the communication device 114, or it may cooperate with the wallet platform 120 in verifying the PIN and/or biometric, etc.

The selected virtual wallet 116 may also interact with the consumer 112 to select and/or solicit input for other options, preferences and/or information associated with the purchase transaction. For example, once the consumer 112 is authenticated (at 516), the virtual wallet 116 may retrieve a consumer profile associated with the consumer 112 (stored in the data structure 122 associated with the wallet platform 120), which may include, without limitation, one or more addresses (e.g., a shipping address, a billing address, etc.) for the consumer 112, contact information (e.g., a phone number, an email address, etc.) for the consumer 112, rewards information, different payment account credentials, etc. The virtual wallet 116 may then present any of the above information, or other information, to the consumer 112 to solicit confirmation, selection and/or input from the consumer 112.

Thereafter, the virtual wallet 116 presents the purchase transaction for the product (e.g., as an order, etc.) for review to the consumer 112, as a review interface (not shown), at 518, whereupon the consumer 112 may select to proceed in the transaction, at 520. And, in response, the virtual wallet 116 provides a checkout resource, at 522, to the merchant 102, via the wallet platform 120. The merchant 102 then requests a payment token from the wallet platform 120, at 524, for the purchase transaction, and the wallet platform 120 in turn returns the payment token to the merchant 102, at 526. The merchant 102 is then able to compile and submit an authorization request for the purchase transaction to the issuer 108a (as being associated with the first payment account used in the selected virtual wallet 116). And, the authorization request (and corresponding purchase transaction for the product) generally proceeds in a conventional manner as described above in the system 100.

Subsequently herein, the consumer 112 may return to the merchant 102, at the virtual location, to make one or more additional purchases. In each additional purchase, the above operations of the method 500 will be repeated, substantially. That said, in such additional purchases, when the wallet platform 120 allows for a selection of the virtual wallets 116 and 118, the consumer's default wallet designation will be imposed. Specifically, in the above example, because the consumer 112 designated the virtual wallet 116 as the default wallet, the virtual wallet 116 will be either preselected and/or auto-selected for the additional purchase, by operation of the cookie(s) in the web browser, or the virtual wallet 116 will be identified to the consumer 112 for the additional purchase, again by operation of the cookie(s) in the web browser, in either case such that the option to select among the two virtual wallets 116 and 118 is omitted. However, and also described above, even with such default setting, the consumer 112 will still be enabled to alter the default designation of the virtual wallet 116 to the other virtual wallet 118 prior to completing the transaction. As should be apparent, given the description above, when the consumer 112 later selects the virtual wallet 118, for example, as the consumer's default virtual wallet, the issuer 108b will then be notified (e.g., at operation 316 in method 300, etc.) of such selection. However, the issuer 108a will not be notified of the change, and may still presume that the virtual wallet 116 is the default virtual wallet based on the prior notification thereto.

With that said, as an alternative to (or as an optional modification to) interfaces 600-800 of FIGS. 6-8, FIGS. 9 and 10 illustrate additional example interfaces 900 and 1000 that may be displayed to the consumer 112 at his/her communication device 114, by the wallet platform 120, in connection with setting the virtual wallet 116, for example, as his/her default wallet.

In particular, FIG. 9 illustrates example settings interface 900, which may be displayed to the consumer 112 (e.g., via an API, etc.) upon initially accessing his/her virtual wallet 116 (e.g., in connection with operation 302 of method 300, etc.). In connection therewith, the consumer 112 is presented with various options relating to the virtual wallet 116, including an option 902 to set the virtual wallet 116 as the default wallet to be used in subsequent transactions by the consumer 112 (i.e., "Set as Preferred Wallet"). In addition, the consumer 112 is presented with an option 904 to specify a particular payment account/card associated with the virtual wallet 116 for which the default wallet setting is applicable (i.e., "Merchant based Preferred Card"). Upon activation of the options 902 and 904, interface 1000 of FIG. 10 is displayed to the consumer 112, confirming, at options 1002 and 1004 that the virtual wallet 116 is set as the consumer's preferred wallet in subsequent transactions, together with the Merchant based Preferred Card as the particular default card. As described above, this selection of the virtual wallet 116 and the particular account/card may be accomplished by dropping one or more cookies relating thereto (e.g., at operations 312 and 313 in method 300, etc.). Or, selection of the virtual wallet 116 as the default wallet for the consumer 112 may be accomplished by dropping one or more cookies, and then selection of the particular preferred payment account/card may be accomplished via an API call by and between the virtual wallet 116 and the wallet platform 120, for example.

With that said, in various exemplary embodiments, consumers herein involved in the different described interactions (including the consumer 112) may be prompted to agree to legal terms associated with and/or provide various consents associated with their payment accounts, for example, during enrollment in their accounts, during association of their payment accounts with one or more virtual wallets (e.g., virtual wallets 116, 118; etc.), etc. In so doing, the consumers may voluntarily agree and/or give permission, for example, to allow the wallet platform 120 to change default wallet and/or account settings, notify issuers of such changes, etc. Further, in some embodiments, the consumers may be prompted to provide such consent upon accessing their virtual wallets, etc. In any case, it is contemplated that the various features described herein will be performed with consent from the associated consumers.

In view of the above, the systems and methods herein permit issuers and other virtual wallet providers to determine whether, or not, their virtual wallets are the default virtual wallets for consumers, and at merchants where the consumers fund purchase transactions. In this manner, the systems and methods herein utilize previously unused data to permit the issuers and/or providers of such virtual wallets to have accurate information about the default virtual wallets associated with the consumers, so that the issuers and/or provides may accurately provide incentives related to the default designations, or offer incentives to compel the consumers to designate their virtual wallets as defaults. The methods and system herein therefore deviate from known techniques associated with default virtual wallet designations to offer insight to issuers and/or providers, where none had previously exited.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) in connection to a request for a transaction involving a consumer and a merchant, soliciting, from a consumer, a selection between a first virtual wallet and a second virtual wallet, each of the first and second virtual wallets associated with a wallet platform, the first virtual wallet associated with a first wallet provider and a payment account issued by the first wallet provider, the second virtual wallet associated with a second wallet provider and a payment account issued by the second wallet provider; (b) soliciting, by the wallet platform, from the consumer, a designation to set a default virtual wallet associated with the merchant involved in the transaction; (c) receiving, at the wallet platform, a request, from the second wallet provider, regarding the default virtual wallet setting associated with the merchant; (d) providing, by the wallet platform, a notification to the second wallet provider, the notification including an indicator of whether or not the second wallet provider is the default virtual wallet for the merchant; (e) capturing and storing, in a data structure of the wallet platform, the designation by the consumer to set the virtual wallet; and (f) providing an offer to the consumer, the offer including at least one incentive to the consumer when the consumer designates the second virtual wallet associated with the second wallet provider as the default virtual wallet.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a wallet platform, a request, from a wallet provider associated with a virtual wallet, for confirmation that the virtual wallet is a default virtual wallet at a communication device; (b) determining, by the wallet platform, whether the virtual wallet is the default virtual wallet at the communication device; (c) providing, by the wallet platform, a notification to the wallet provider, wherein the notification indicates whether or not the virtual wallet is the default virtual wallet at the communication device, thereby permitting the wallet provider to incentivize a consumer associated with the communication device to select the virtual wallet as the default virtual wallet when the virtual wallet is not the default virtual wallet; (d) identifying a different virtual wallet as the default virtual wallet at the communication device, prior to receiving the request for confirmation from the wallet provider; and (e) providing an offer to the consumer at the communication device to designate the virtual wallet associated with the wallet provider as the default virtual wallet at the communication device.

As will further be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, by a wallet platform, a payload request from a virtual wallet at a communication device, the payload request related to a default virtual wallet for the communication device; (b) verifying, by the wallet platform, the payload request; (c) in response to the payload request, identifying, by the wallet platform, the virtual wallet as the default virtual wallet for the communication device, whereby the virtual wallet is identified as the default virtual wallet for subsequent transactions performed via the communication device; (d) receiving a request for a signed payload from the virtual wallet; (e) providing the signed payload to the virtual wallet, wherein the payload request includes at least a part of the signed payload; (f) retrieving a public key associated with the virtual wallet; (g) receiving, by the wallet platform, a second payload request from a second virtual wallet at the communication device, the second payload request related to the default virtual wallet for the communication device; (h) verifying, by the wallet platform, the second payload request based on a key associated with the second virtual wallet; and (i) in response to the second payload request, identifying, by the wallet platform, the second virtual wallet as the default virtual wallet for the communication device, thereby deleting the virtual wallet as the default virtual wallet for the communication device.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for notifying a first wallet provider associated with a first virtual wallet whether or not the first virtual wallet is a default virtual wallet for a communication device, the computer-implemented method comprising:

receiving, at a wallet platform, a request, from the first wallet provider associated with the first virtual wallet, for confirmation that the first virtual wallet is the default virtual wallet at the communication device specific to a consumer, wherein the wallet platform and the first wallet provider are each separate from the communication device, and wherein the wallet platform is separate from the first wallet provider; and then, in response to receiving the request:

determining, by the wallet platform, a second virtual wallet associated with a second wallet provider is the default virtual wallet at the communication device, based on a last dropped cookie related to the second virtual wallet present in the communication device, wherein determining the second virtual wallet is the default virtual wallet is apart from a transaction to be funded through the default virtual wallet; and providing, by the wallet platform, a notification to the first wallet provider, wherein the notification indicates the first virtual wallet associated with the first wallet provider is not the default virtual wallet at the communication device, thereby permitting the first wallet provider to incentivize the consumer to select the first virtual wallet as the default virtual wallet.

2. The computer-implemented method of claim 1, wherein the first wallet provider includes an issuer of a payment account provisioned to the first virtual wallet.

3. The computer-implemented method of claim 1, further comprising providing an offer to the consumer at the communication device to designate the first virtual wallet associated with the first wallet provider as the default virtual wallet at the communication device.

4. The computer-implemented method of claim 3, wherein the offer includes at least one incentive associated with a reduction in a cost of a product for purchase at a merchant when funded through the first virtual wallet associated with the first wallet provider.

5. The computer-implemented method of claim 3, wherein the offer includes at least one incentive associated with a discount for a transaction funded through the first virtual wallet associated with the first wallet provider.

6. A system for use in notifying a first wallet provider associated with a first virtual wallet that the first virtual wallet is or is not a default virtual wallet for a communication device, the system comprising:

a wallet platform computing device configured to:

receive a request from the first wallet provider to determine whether the first virtual wallet associated with the first wallet provider is the default virtual wallet for the communication device specific to a consumer, wherein the first wallet provider is separate from the communication device; and then in response to the request from the first wallet provider, determine whether the first virtual wallet is the default virtual wallet for the communication device, based on one or more cookies at the communication device, apart from a transaction to be funded through the default virtual wallet for the communication device; and notify the first wallet provider that the first virtual wallet is not the default virtual wallet, when the first virtual wallet is not the default virtual wallet for the communication device, thereby permitting the first wallet provider to incentivize the consumer to select the first virtual wallet as the default virtual wallet for the communication device.

7. The system of claim 6, wherein the wallet platform computing device is further configured to notify the first wallet provider that the first virtual wallet is the default virtual wallet, when the first virtual wallet is the default virtual wallet for the communication device.

8. The system of claim 6, wherein the one or more cookies are specific to a merchant; and wherein the wallet platform computing device is configured, in connection with notifying the first wallet provider that the first virtual wallet is not the default virtual wallet, to further notify the first wallet provider of the merchant.

9. The system of claim 6, wherein the first wallet provider includes an issuer of a payment account provisioned to the first virtual wallet.

* * * * *